UNITED STATES PATENT OFFICE.

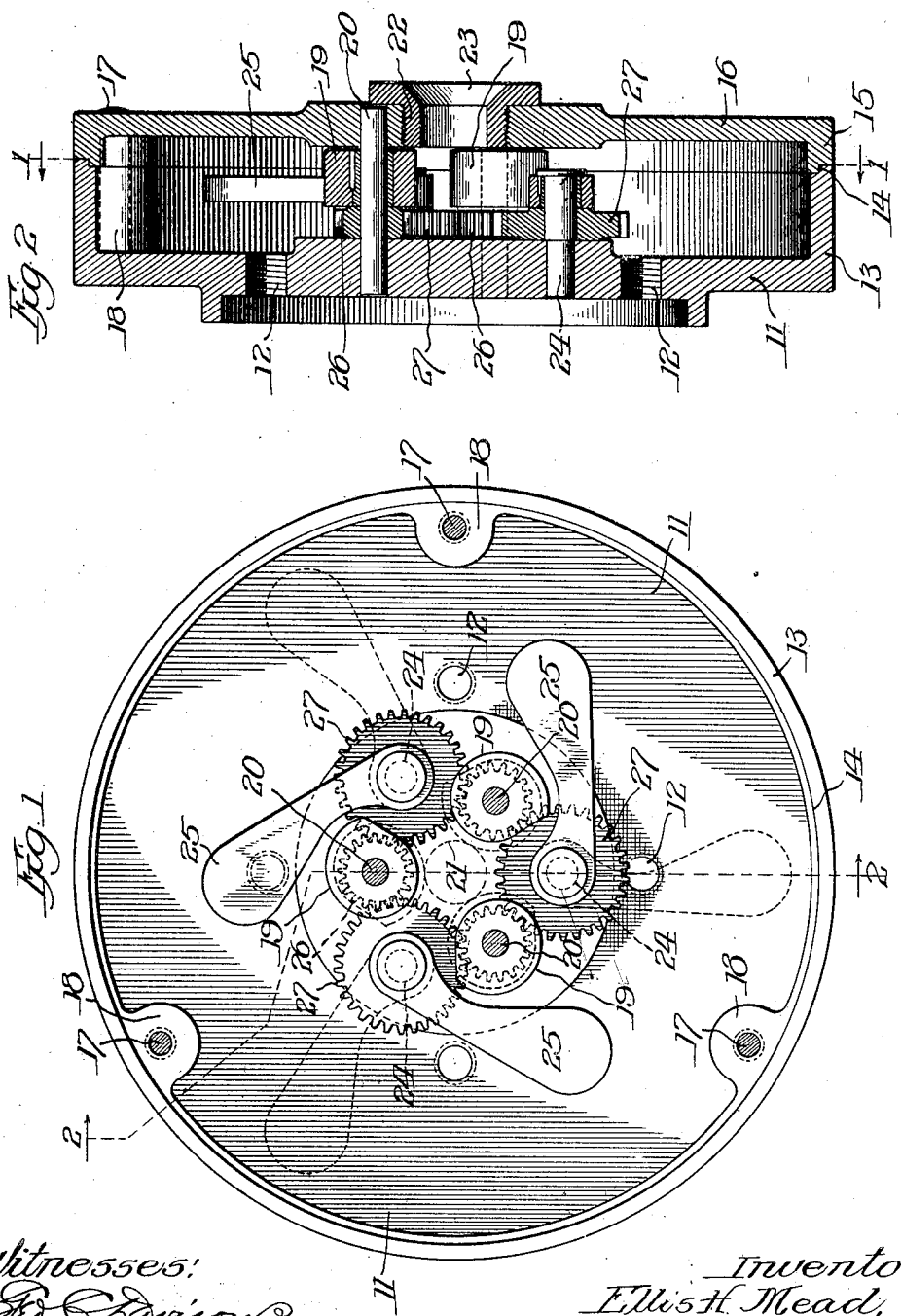
E. H. MEAD.
AUTOMATIC CENTERING CHUCK.
APPLICATION FILED SEPT. 30, 1912.
1,056,435.
Patented Mar. 18, 1913.

ELLIS H. MEAD, OF WESTERN SPRINGS, ILLINOIS, ASSIGNOR TO THE MIEHLE PRINTING PRESS AND MANUFACTURING COMPANY, OF CHICAGO, ILLINOIS, A CORPORATION OF ILLINOIS.

AUTOMATIC CENTERING-CHUCK.

1,056,435.

Specification of Letters Patent.

Patented Mar. 18, 1913.

Application filed September 30, 1912. Serial No. 723,060.

*To all whom it may concern:*

Be it known that I, ELLIS H. MEAD, a citizen of the United States, residing at Western Springs, in the county of Cook and State of Illinois, have invented certain new and useful Improvements in Automatic Centering-Chucks, of which the following is a specification.

My invention relates to shop appliances and has particular reference to a novel form of chuck for lathes and the like wherein the work-piece is automatically centered and firmly held by centrifugally operated members.

In the accompanying drawing wherein corresponding parts are designated by similar reference numerals, I have shown by way of illustration a preferred embodiment of the invention.

In these drawings, Figure 1 is a front elevation of the chuck with the face plate removed to show the interior mechanism; and Fig. 2 is a section on the line 2—2 of Fig. 1.

In the drawing the rotary chuck case is shown as comprising a base plate 11 provided with bolt holes 12 whereby it may be rigidly attached to the head of the lathe, the base plate having a forwardly extending angular flange or rim 13 stepped in its outer edge at 14 to receive the correspondingly stepped edge of the rim 15 of the face plate 16, said face plate serving as a cover for the chuck case to which it is secured by means of screws 17 threaded into lugs 18 of the case.

Within the case and upon the base plate 11 thereof are mounted a plurality of cams 19 adapted to rotate upon the shafts 20 in a plane parallel to the plane of rotation of the chuck and in the plane of their own orbit of revolution about the axis of the chuck. Preferably and as illustrated these cams are three in number and are equally spaced concentrically of the case being angularly displaced 120 degrees one from another. The distance separating the cams from each other and from the center of the chuck is so gaged as to accommodate therebetween the end of the work-piece such as a rod or the like, not shown but indicated by the broken line at 21. The face or cover plate 16 is provided at its center with an apertured bushing 22 for the accommodation of the work-piece. The axis of the bushing coincides with the center of the base plate 11 equally distant from the cams 19, said bushing having advantageously a flaring approach as indicated at 23.

Interposed between the cams 19 and equally spaced therefrom are three shafts 24 each of which has fixed upon its outer end an eccentrically disposed member such as a weighted lever arm 25 which extends radially from said shaft. Each of the cam shafts 20 has fixed thereon a pinion 26 in mesh upon each side with a pinion 27 carried by the lever shaft 24 so that the three cams and the three levers are in gear with each other and rotate in unison.

The relative arrangement of the cams and levers is such that when the levers occupy the position shown in full lines in Fig. 1, the smallest radius of each cam is disposed toward the central space provided for the reception of the work-piece 21 and as the levers swing from the substantially tangential position shown in full lines to the radial position shown in dotted lines in said figure the cams are turned by means of the interposed gearing to the position shown in dotted lines whereby the greater throw of said cams is brought into action to reduce the central interspace and thereby to clamp the work-piece upon three sides. The operation of the chuck will be readily apparent. The work-piece having been inserted through the apertured bushing 22, with its end lying loosely between the three cams 19 the chuck is rotated by the starting of the machine and the lever arms are by centrifugal action swung from the position indicated in full lines toward that indicated in dotted lines. The interposed gearing transmits such movement of the lever arms and their shafts to the cams 19 which are rotated in unison and the work-piece is automatically brought to a central position by its contact with the cam faces, being firmly gripped in such position and held against dislodgment and caused to partake of the rotary movement of the chuck. Upon the stopping of the machine the work-piece may be readily turned in a reverse direction by hand whereby the gripping action of the cams is instantly released permitting the withdrawal or readjustment of the work-piece.

It will be seen that by reason of the spacing of the cams about the center of the chuck and the gearing of the cams together so that they are compelled to operate in unison the cams are caused to not only grip the work-piece but to accurately bring the same to a centered position before such gripping action takes place. It will also be appreciated that any resistance interposed to the rotation of the work-piece with the chuck serves to cause an even greater gripping action of the cams so as to preclude any slipping, while any movement of the work-piece in a reverse direction will cause the instant release of the same by the cams.

While I have herein shown a preferred embodiment of the invention it will be readily understood that modifications of the same will readily be suggested to those skilled in the art which modifications come within the spirit and essence of the invention as set out in the accompanying claims.

I claim:

1. In a chuck, a rotary body, a plurality of cams mounted thereon in a circle about a central space to rotate in a plane parallel to the plane of rotation of the body, and centrifugally actuated means to rotate the cams is unison, substantially as described.

2. In a chuck, a rotary body, a plurality of cams mounted thereon in a circle about a central space to rotate in a plane parallel to the plane of rotation of the body, the several cams geared together to rotate in unison, and centrifugally actuated means to rotate the cams, substantially as described.

3. In a chuck, a rotary body, a plurality of cams mounted thereon in a circle and adapted to receive a work-piece therebetween, and eccentrically disposed members connected with the cams and angularly movable by centrifugal action whereby to rotate the cams to clamp the work piece therebetween, substantially as described.

4. In a chuck, a rotary body, a plurality of intergeared cams mounted thereon in a circle to rotate in the plane of their orbit and adapted to receive a work-piece therebetween, and eccentrically disposed members connected with the cams and angularly movable therewith, substantially as described.

5. In a chuck, a rotary body, a plurality of cams mounted thereon in a circle to rotate in the plane of their orbit, the several cams geared together to rotate in unison, and radially extending arms fixedly mounted on certain of the gear members, substantially as described.

6. In a chuck, a rotary body, a plurality of cams mounted thereon in a circle to rotate in the plane of their orbit and provided with gear teeth, a plurality of gear members arranged between the adjacent cams and in mesh therewith to cause the cams to rotate in unison, and radially extending arms fixedly mounted upon the interposed gear members, substantially as described.

7. In a chuck, a rotary body, a plurality of cams mounted thereon in a circle to provide a central space for the reception of the work-piece, each of the cams provided with gear teeth, a gear member arranged between each pair of adjacent cams and in mesh with the teeth thereof, and a weighted arm extending radially in fixed relation to each of said interposed gear members, substantially as described.

8. In a chuck, a hollow rotary body, cam shafts journaled therein and extending therefrom perpendicular to the plane of rotation and equally spaced from each other in a circle about the axis of rotation, cams fixed upon said shafts, pinions fixed upon said shafts, other shafts similarly journaled in the body intermediate the cam shafts, pinions upon said other shafts, each of the pinions being in mesh with the two adjacent pinions, weighted lever arms fixed upon the second set of shafts and extending radially therefrom, a space being provided about the axis of rotation and between the several cams for the reception of a work-piece, and a cover plate for said chuck provided with a central opening for the passage of the work-piece, substantially as described.

ELLIS H. MEAD.

Witnesses:
LEWIS T. GREIST,
T. D. BUTLER.

Copies of this patent may be obtained for five cents each, by addressing the "Commissioner of Patents, Washington, D. C."